United States Patent [19]

Bixby

[11] Patent Number: 4,511,931

[45] Date of Patent: Apr. 16, 1985

[54] SLOW MOTION USING LONGITUDINAL RECORDING AND FORWARD/REVERSE TAPE TRANSPORTATION

[75] Inventor: James A. Bixby, San Diego, Calif.

[73] Assignee: Eastman Kodak Company, Rochester, N.Y.

[21] Appl. No.: 172,915

[22] Filed: Jul. 28, 1980

[51] Int. Cl.³ .......................................... H04N 5/782
[52] U.S. Cl. .................................................. 360/10.3
[58] Field of Search ...................... 358/127, 310, 312; 360/9, 10, 11, 14, 33, 35, 10.3

[56] References Cited

U.S. PATENT DOCUMENTS

| 3,051,777 | 8/1962 | Lemelson | 360/35 |
| 3,294,902 | 12/1966 | Maxey . | |
| 3,919,716 | 11/1975 | Yumde et al. | 369/9 |
| 3,942,188 | 3/1976 | Tanabe et al. . | |
| 4,193,098 | 3/1980 | Bixby et al. | 360/10 |
| 4,198,656 | 4/1980 | Mathisen | 358/127 |
| 4,263,623 | 4/1981 | Woo et al. | 360/10 |
| 4,280,151 | 7/1981 | Tsunekawa et al. | 360/33 |
| 4,290,081 | 9/1981 | Foerster | 360/10 X |

Primary Examiner—Donald McElheny, Jr.
Attorney, Agent, or Firm—Robert F. Cody

[57] ABSTRACT

Longitudinal recording apparatus for producing a slow motion display of scene information that has been recorded on a magnetic recording medium is disclosed. In accordance with a presently preferred embodiment, the recording medium is periodically transported in accordance with either a forward or reverse transport cycle during which a frame of scene information is played back from the recording medium and stored in a frame storage device for repeated display on a video monitor. Transportation of the recording medium in accordance with successive forward transport cycles results in a forward slow motion display of scene information, while successive reverse transport cycles result in a reverse slow motion display of scene information.

7 Claims, 7 Drawing Figures

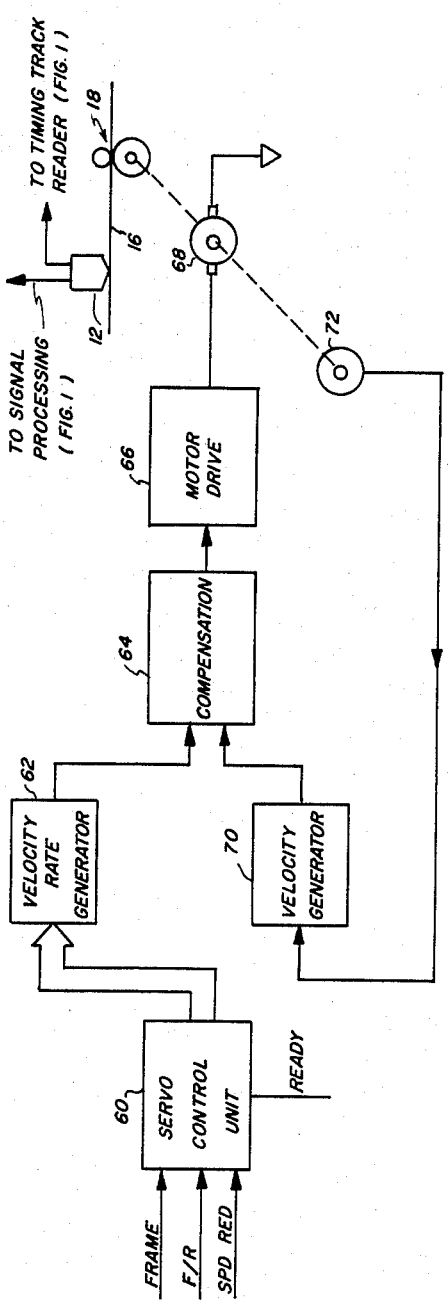
FIG. 4
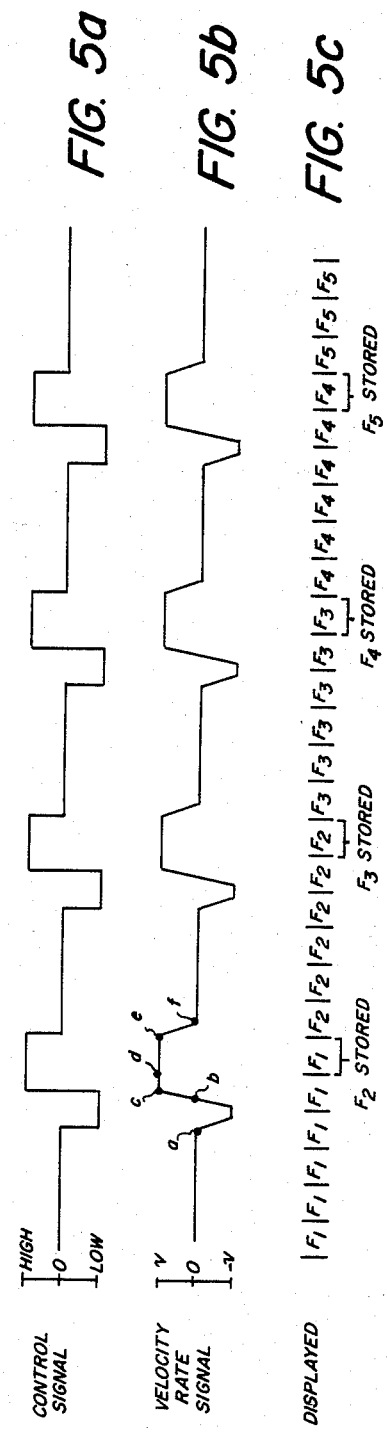
FIG. 5a
FIG. 5b
FIG. 5c

SLOW MOTION USING LONGITUDINAL RECORDING AND FORWARD/REVERSE TAPE TRANSPORTATION

BACKGROUND OF THE INVENTION

1. Field of the Invention

The present invention relates to the slow motion display of frames of time sequential scene information through the use of longitudinal recording techniques.

2. Description Relative to the Prior Art

In longitudinal recording, a magnetic tape is advanced in the lengthwise direction of the tape while information is recorded along a track(s) that extends parallel to the direction of tape advancement. In general, a longitudinal recorder is classified as either a "rotary head" or "stationary head" longitudinal recorder, depending on whether the magnetic head(s) moves during the recording and playback operations. In the case of a rotary head longitudinal recorder, it is common practice to use a pair (or more) of magnetic heads mounted on the periphery of a drum about which the tape is partially wrapped. During recording, the drum rotates and the signals to be recorded are switched among the heads so that each head records during a time in which it contacts the tape. In a stationary head longitudinal recorder, on the other hand, the magnetic head(s) remains fixed in position while the magnetic tape is advanced longitudinally past the head.

Ideally, a technique for providing slow motion should be capable of forward slow motion (frames displayed in chronological order) and reverse slow motion (frames displayed in reverse chronological order), as well as being able to provide stop motion display of scene information. Further, the amount by which a moving object in the scene appears to be slowed down, hereinafter referred to as the speed reduction, should be variable.

It is generally known in the art to produce slow motion using a rotary head longitudinal recorder. For example, U.S. Pat. No. 3,942,188 discloses such a system wherein slow motion results from an adjustment of playback tape speed and head rotation rate so that each frame of scene information is played back and displayed a plurality of times. U.S. Pat. No. 3,294,902 discloses a similar system wherein portions of each frame are repeated so as to produce a slow motion effect. Apart from the inherent complexity attendant to the use of rotary heads, both of these systems suffer from a serious disadvantage in that the useful lives of the magnetic heads and the magnetic tape are relatively short. This problem is particularly acute for stop motion, or slow motion at high speed reductions because the playback heads repeatedly scrape the same segment of the magnetic tape. The resulting abrasive forces quickly wear the heads past the point of usefulness, as well as cause severe physical damage to the tape surface.

U.S. Pat. No. 3,588,334 discloses a slow motion video recording system that uses a longitudinal recorder of the stationary head type. In accordance with that disclosure, scene information is scanned by a camera that is operated at a fast frame rate and displayed at a slower frame rate to produce a slow motion display. The required frame rate conversion is accomplished by recording information at a fast tape speed and playing it back at a slower tape speed. While avoiding certain problems associated with excessive head and tape wear, this system is severely limited in the amount of speed reduction that it can provide. This is because the maximum obtainable speed reduction is limited by the frame rate at which the scene can be scanned by the camera. And, even assuming the use of present state-of-the-art camera technology, camera scan rates of more than a few times the standard scan rate are exceedingly difficult to achieve without a large sacrifice in resolution. The result is that such a system is limited in operation to relatively low speed reductions. It is also desirable to have a stop motion and a reverse motion capability, neither of which is available with the system disclosed in U.S. Pat. No. 3,588,334.

SUMMARY OF THE INVENTION

The present invention provides methods and apparatus for use in providing a slow motion display of scene information. The disclosed technique (1) minimizes head and tape wear, (2) provides high speed reductions without requiring fast frame readout of a camera, and (3) has both forward and reverse slow motion capability at a variable speed reduction, as well as a stop motion mode of operation.

In accordance with one aspect of the invention, a technique for slow motion display of scene information is disclosed for use with a magnetic recording medium having a plurality of frames of time sequential scene information recorded thereon. Means are provided for periodically transporting the recording medium in accordance with a transport cycle wherein the recording medium is transported in the reverse direction and then in the forward direction. A frame of scene information is played back each transport cycle during the period of forward transportation of the recording medium. A frame storage device stores the frame of scene information as it is played back from the recording medium. By continually reading out information from the frame storage device (rather than repeatedly playing back information from the recording medium) and displaying such information on a video monitor, a slow motion display of scene information is produced with minimal head and tape wear. The speed reduction is adjustable by varying the time interval between transport cycles. In addition, either forward or reverse slow motion is selectable by controlling the relative distance the recording medium is transported in the forward and reverse directions.

BRIEF DESCRIPTION OF THE DRAWINGS

In the detailed description of the preferred embodiments of the invention presented below, reference is made to the accompanying drawings in which:

FIG. 4 is a simplified block schematic diagram of a servo system that controls the transportation of magnetic tape in the longitudinal recording apparatus shown in FIG. 1; and FIGS. 5a through 5c are diagrams useful in describing the operation of the servo system shown in FIG. 4.

DETAILED DESCRIPTION OF THE INVENTION

Figure 1:
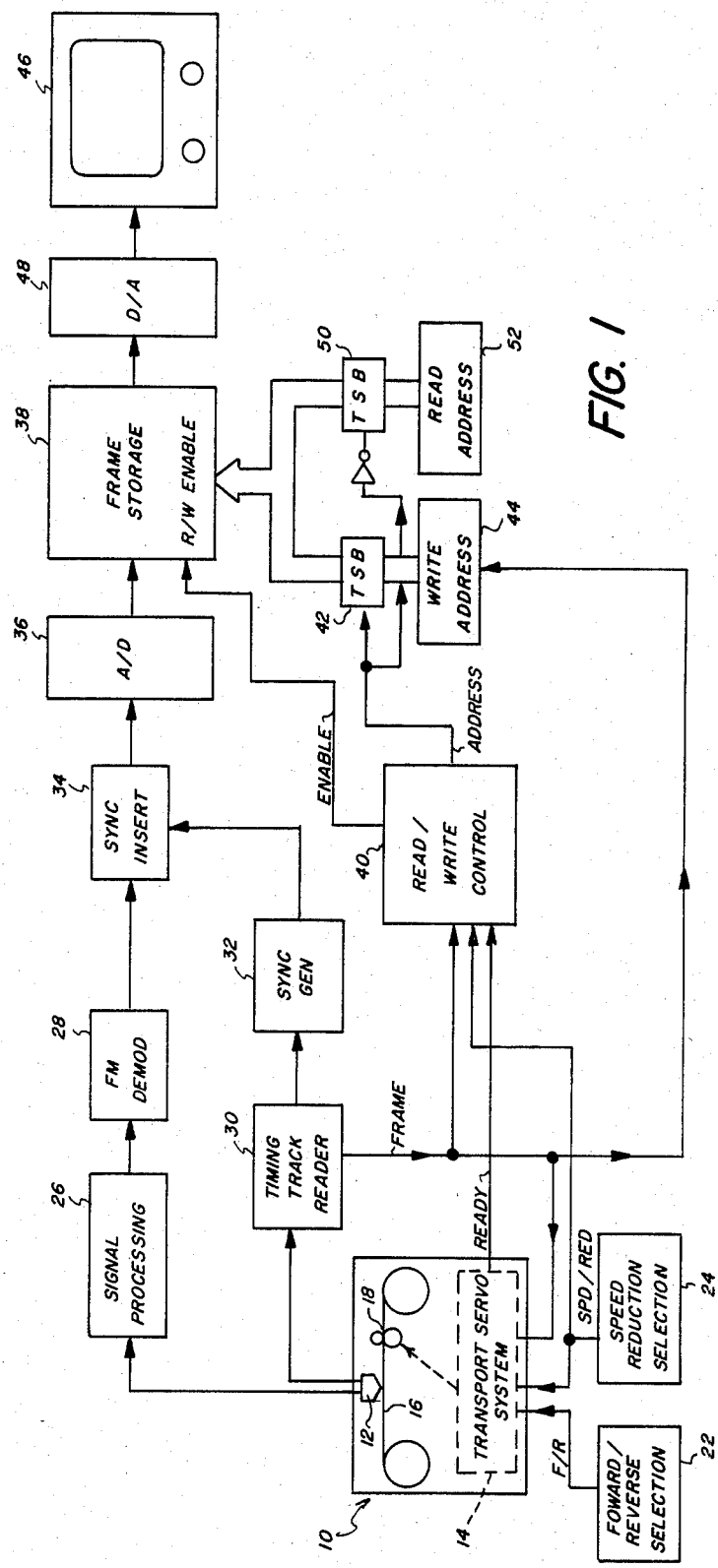
FIG. 1 is a block schematic diagram of longitudinal recording apparatus in accordance with the present invention.

In accordance with a presently preferred embodiment of the invention, a stationary head longitudinal recording apparatus for use in providing forward and reverse slow motion display of scene information at an adjustable speed reduction is disclosed. Referring to FIG. 1, a longitudinal recorder 10 having a stationary magnetic head 12 is shown, the recorder 10 having a transport servo system 14 that controls the transportation of a magnetic tape 16 via a capstan drive mechanism 18. It is assumed that information is recorded on the magnetic tape 16 in the form of a plurality of frames of time sequential scene information. Such recording is known in the art and forms no part of the present invention. The transport servo system 14, described in more detail below with reference to FIGS. 4 and 5, causes the tape 16 to be periodically transported in accordance with either a forward transport cycle or a reverse transport cycle during which a frame of scene information is played back by the magnetic head 12. Depending on whether the forward transport cycle or the reverse transport cycle is selected, frames of scene information will be played back in chronological order or reverse chronological order, respectively. As discussed below, the playback of frames of scene information in chronological order results in forward slow motion display of scene information, while playback of frames of scene information in reverse chronological order results in reverse slow motion display of scene information.

Figure 2:
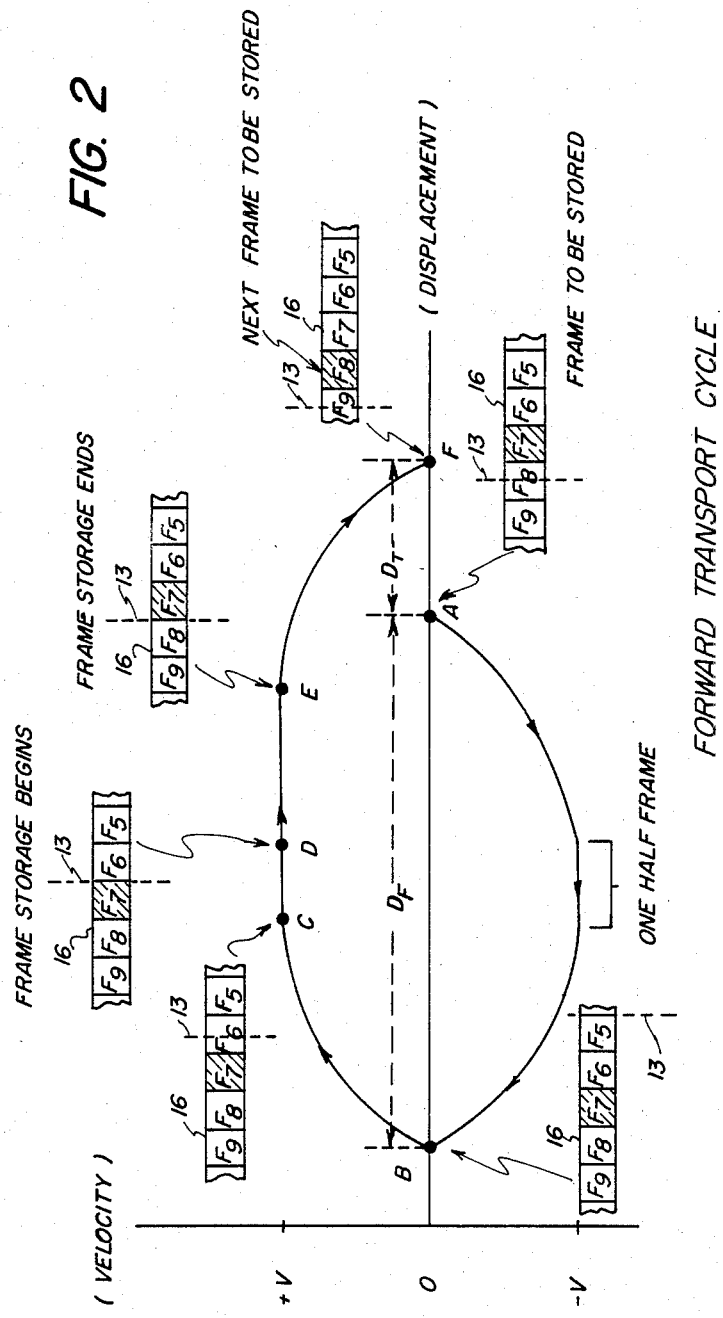
FIGS. 2 and 3 are diagrams illustrating a forward transport cycle (for producing forward slow motion) and a reverse transport cycle (for producing reverse slow motion)
Figure 3:
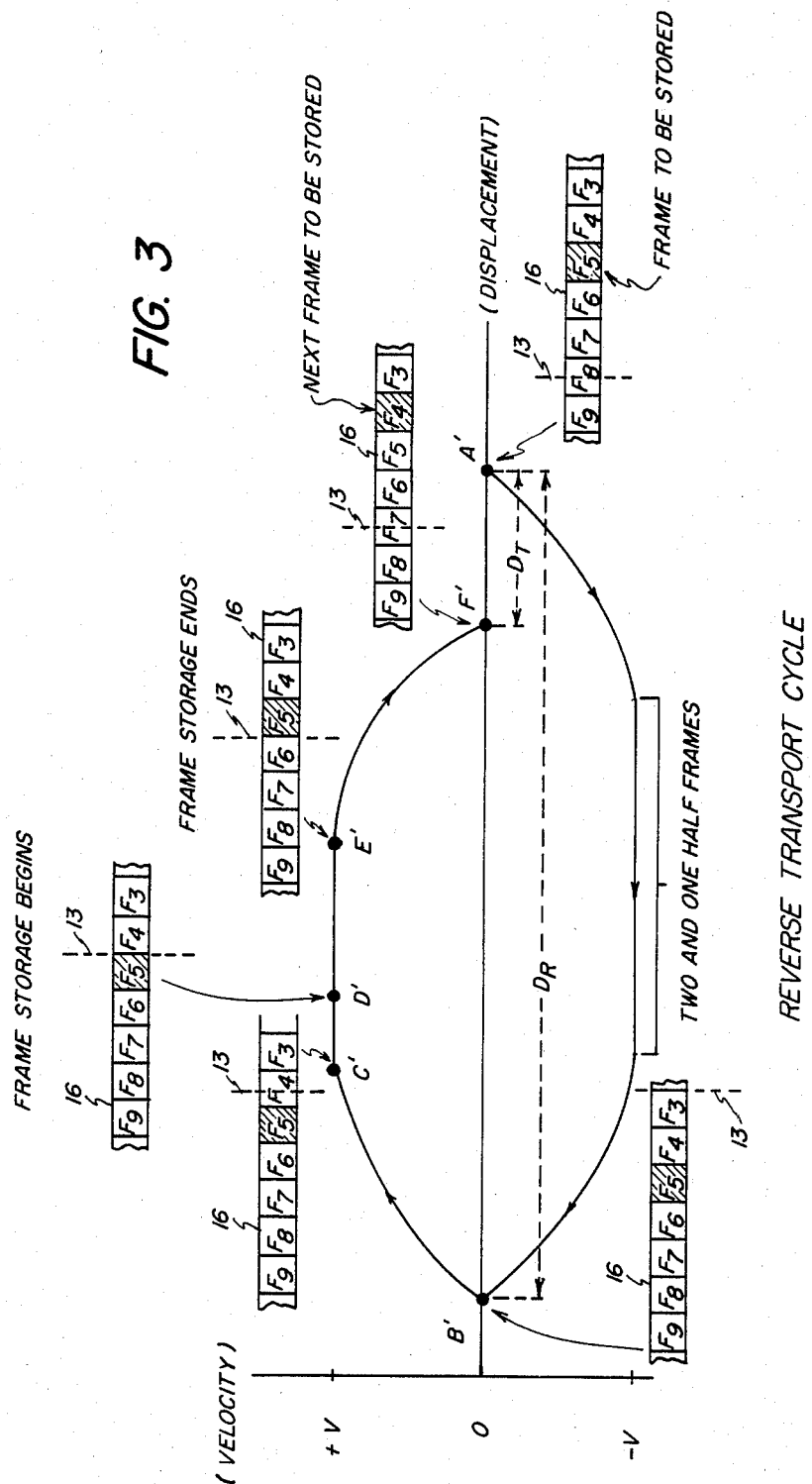

Before discussing further the recording apparatus shown in FIG. 1, it is appropriate at this point to consider the tape transportation that occurs in the forward and reverse transport cycles. For purposes of facilitating the explanation of the forward and reverse transport cycles, the recording tape 16 is shown in FIGS. 2 and 3 as being divided into frames denoted by $F_n$, where n is an integer. Such frame divisions will coincide with the physical location of frames of scene information when a single magnetic head is used for recording, as is assumed throughout the description which follows. It will be apparent to those skilled in the art, however, that the present invention is equally useful where two or more spaced head structures are used for recording (and playback). In such a case, however, the indicated frame divisions do not represent the physical locations of frames of scene information but, rather, represent the distances that the recording tape 16 would be transported to result in playback of particular frames of scene information.

The forward transport cycle is illustrated in FIG. 2 by means of a graph showing the relationship between tape displacement (abscissa) and tape velocity (ordinate). Point A represents the start of the forward transport cycle, at which point the magnetic tape 16 is stationary. The transducer gap of the head 12, indicated by the broken line 13, is shown as being positioned in the middle of frame $F_8$. The tape 16 is first transported a distance $D_F$ in the reverse direction (i.e., the direction opposite to that used for playback of recorded information) to the position shown at point B. Such transportation of the tape 16 from point A to point B is accomplished by accelerating the tape 16 in the reverse direction until the tape 16 attains a velocity equal to $-V$. The tape 16 is transported at this velocity ($-V$) for a time sufficient to transport the tape 16 one-half of a frame, at which time the tape 16 is decelerated to zero velocity. The tape 16 is then transported in the forward direction (i.e., the direction of tape advancement used for playback of recorded information) a total distance of $D_F$ plus $D_T$ to point F, where $D_T$ is equal to the distance the tape 16 must be transported in the forward direction to result in playback of a frame of scene information. This forward transportation of the tape 16 from point B to point F is accomplished by accelerating the tape 16 in the forward direction until the tape 16 attains a velocity equal to V; see point C. Between points D and E the frame of scene information which it is desired to store (frame $F_7$) is played back and stored in a frame storage device. (As discussed below, frame marking signals are used to determine the time at which playback of frame $F_7$ begins.) The tape 16 is then decelerated and comes to rest at the position shown at point F, thereby completing one forward transport cycle. Transportation of the tape 16 through a subsequent forward transport cycle results in playback and storage of frame $F_8$, and so on.

While the tape 16 may be transported in the reverse and forward directions by any combination of velocities and accelerations that result in playback of frames of scene information in chronological order for successive forward transport cycles, it is advantageous to transport the tape 16 in accordance with a forward transport cycle similar to that shown in FIG. 2. Specifically, each time the tape 16 is accelerated or decelerated the same velocity vs. displacement curve is used (apart from sign inversion). Such transportation reduces the complexity of the transport servo system which controls the tape transportation. Moreover, all tape displacements arising from periods of tape acceleration and deceleration cancel each other over the course of a complete forward transport cycle; for reasons which are discussed below, this condition is important in ensuring that the tape position at the completion of one forward transport cycle is a suitable initial tape position for the next forward transport cycle.

The reverse transport cycle, shown in FIG. 3, is similar to the forward transport cycle just described except that during transportation of the tape 16 between the positions shown at points A' and B' the tape 16 is transported a distance corresponding to two and one-half frames during the period of constant velocity tape transportation. (As discussed above, the corresponding distance in the forward transport cycle is one-half a frame.) All other segments of the velocity vs. displacement curve for the reverse transport cycle are identical to corresponding segments in the forward transport cycle. Specifically, the tape 16 is transported a distance $D_R$ in the reverse direction (to the position shown at point B'), and then a distance $D_R$ minus $D_T$ in the forward direction (to the position shown at point F'). During transportation of the tape 16 from the position shown at point D' to the position shown at point E', frame $F_5$ is played back and stored in a frame storage device. Transportation of the tape 16 in accordance with a subsequent reverse transport cycle results in playback and storage of frame $F_4$, and so on.

To summarize the forward and reverse transport cycles, assume that the transducer gap line is initially located at frame $F_n$. In the forward transport cycle, frame $F_{n-1}$ is stored and at the completion of a forward transport cycle the transducer gap line is located at frame $F_{n+1}$. Successive forward transport cycles, therefore, result in playback and storage of frames of scene information in chronological order. In the reverse transport cycle, frame $F_{n-2}$ is stored and at the completion of a reverse transport cycle the transducer gap line is located at frame $F_{n-1}$. Successive reverse transport cycles, therefore, result in playback and storage of frames of scene information in reverse chronological order.

The forward and reverse transport cycles, and the frame storage operation described above are implemented by the recording apparatus previously referred to in connection with FIG. 1. An operator selects either the forward or reverse slow motion mode of operation by means of a forward/reverse selection circuit 22 that tells the transport servo system 14 to transport the tape 16 in accordance with the forward or reverse transport cycles described above. The operator also selects the desired speed reduction by means of a speed reduction selection circuit 24. The selected speed reduction determines the duration of the time interval between successive transport cycles. In operation, therefore, the transport servo system 14 transports the tape 16 through a single transport cycle (forward or reverse, depending on whether the forward or reverse slow motion mode of operation is selected). Scene information played back by the playback head 12 passes through a signal processing circuit 26 (for purposes of equalization, etc.) before being demodulated by an FM demodulation circuit 28. A frame marking signal is also reproduced by the head 12. The frame marking signal may be of any type that provides information as to the time at which playback of a frame of scene information begins. A timing track reader 30 produces a FRAME signal based on the reproduced frame marking signal. In addition, the timing track reader 30 drives a sync generator 32 which produces standard (or other type) sync signals that are inserted in the demodulated scene information signal by a sync insert circuit 34.

After conversion to digital form by means of an analog-to-digital (A/D) converter 36, the scene information signal is in a form suitable for storage in a frame storage device 38. The frame storage device 38 may be selected from among the various types of such devices known in the art such as an array of random access memories (RAM's) operated in parallel. Not all scene information that is applied to the frame storage device 38 is stored therein, however. A read/write control circuit 40 functions to control the writing of information into the frame storage device 38 such that only a single frame of scene information is stored per transport cycle. In particular, the transport servo system 14 sends a READY signal to the read/write control circuit 40 which tells the read/write control circuit when the point C (forward transport cycle, FIG. 2) or C' (reverse transport cycle, FIG. 3) is reached in the transport cycle. The FRAME signal from the timing track reader 30 then tells the read/write control circuit 40 when playback begins of the next frame of scene information. At this time, the read/write control circuit 40 produces a high logic level ENABLE signal that enables the frame storage device 38 for writing. In addition, an ADDRESS signal from the record/write control circuit 40 goes high causing a tri-state buffer (TSB) circuit 42 to assume a low impedance state, thereby causing information to be read into the frame storage device 38 in accordance with an address count produced by a write address generator 44. (The FRAME signal is used to synchronize the write address count with the beginning of a frame of scene information.) The FRAME signal also tells the read/write control circuit 40 the time at which playback of the frame of scene information is completed, at which time the ENABLE signal goes low to enable the frame storage device 38 for read-out. (As discussed below, the read/write control circuit 40 actually switches the ENABLE signal high and low many times while a frame of scene information is being written into the frame storage device 38. Such switching is timed to allow scene information to be read out from the frame storage device 38 at the same time a new frame of scene information is being written into the frame storage device 38. This technique is well known in the art and forms no part of the present invention.)

To produce a slow motion display of scene information, the read/write control circuit 40 causes each stored frame to be read out a plurality of times for display on a video monitor 46 after conversion to analog form by a digital-to-analog converter (D/A) 48. The number of times each frame of scene information is displayed is determined by the selected speed reduction. For example, a selected speed reduction of six results in each frame of scene information being displayed six times. A SPD RED signal communicates the selected speed reduction to the read/write control circuit 40 which holds the ENABLE and ADDRESS signals at a low logic level for a time sufficient to allow each frame of scene information to be displayed the desired number of times. The low ADDRESS signal causes a tri-state buffer (TSB) circuit 50 to assume a low impedance state so that a read address count from a read address generator 52 controls readout of information from the frame storage device 38. The read address generator is a sequential counter that causes scene information to be repeatedly read out from the frame storage device 38. (The count rate of the read address generator 52 is synchronized, by means not shown, to the raster scan rate of the video monitor 46.)

To provide a constant stream of scene information to the video monitor 46, the read address generator 52 produces a read address count that continually and repeatedly causes readout of information from the frame storage device 38. As a result, writing of a new frame of scene information into the frame storage device 38 (during the next transport cycle) must occur simultaneously with the readout process. Such simultaneous reading and writing is accomplished by the read/write control circuit 40 which switches back and forth between the reading and writing operations. As stated above, this technique of simultaneous reading and writing is known in the art and forms no part of the present invention.

The SPD RED signal from the speed reduction selection circuit 24 also controls the cycling rate of the transport servo system 14. As discussed above, the transport servo system 14 transports the tape 16 in accordance with a (forward or reverse) transport cycle and then brings the tape 16 to rest. During this transport cycle a frame of scene information is stored in the frame storage device for repeated display on the video monitor 46. At some time later, the transport servo system 14 transports the tape 16 through another transport cycle during which the frame of scene information previously stored in the frame storage device 38 is replaced with a different frame of scene information. The time interval, therefore, between successive transport cycles determines the speed reduction by controlling the number of times each frame of scene information is displayed by the video monitor 46.

The transport servo system 14 is shown in more detail in FIG. 4. A servo control unit 60 receives as input information (1) the FRAME signal, which tells the servo control unit 60 when playback of a frame of scene information begins, (2) the F/R signal, indicating the operator's choice of forward or reverse slow motion, and (3) the SPD RED signal, which indicates the selected speed reduction. Using this information (in a manner discussed in detail below with reference to FIGS. 5a through 5c) the servo control unit 60 controls the operation of a velocity rate generator 62. A velocity rate signal is produced by the rate generator 62 that causes the capstan drive mechanism 18 to transport the tape 16 in accordance with the selection of the forward or reverse transport cycles. A servo loop is provided for this purpose comprising a compensation circuit 64, a motor drive circuit 66 for driving a capstan motor 68, and a velocity generator circuit 70 that produces an output signal representative of the motor speed as determined by tachometer 72.

Referring now to FIGS. 4 and 5a through 5c, operation of the transport servo system will be described in detail assuming selection of the forward slow motion mode of operation and a speed reduction of six. The servo control unit 60 produces a CONTROL signal as shown in FIG. 5a. The control signal causes the velocity rate generator 62 to produce the velocity rate signal shown in FIG. 5b. The amplitude of the velocity rate signal determines the velocity at which the tape 16 is transported. The corresponding points A through F of the forward transport cycle described above are shown in lower case in FIG. 5b. When the control signal goes low, the velocity rate signal produced by the rate generator 62 goes to a low level labelled as $-v$ (this level of the velocity rate signal causes the tape 16 to be transported at a velocity equal to $-V$). The velocity rate signal remains at $-v$ for a relatively short duration and then changes to a level of v (point c), again along a linear velocity ramp. At this point the tape 16 is being transported at a velocity equal to V and storage of a frame of scene information will begin when the FRAME signal indicates the beginning of playback of the next frame (F$_2$) of scene information (point d). As indicated in FIG. 5c, frame F$_1$ is displayed while frame F$_2$ is being stored in the frame storage device. Upon completion of playback and storage of frame F$_2$ (point e), the CONTROL signal returns to the zero level, thereby causing the velocity rate signal to return to the zero level (point f), again along a linear velocity ramp. This point (point f) marks the completion of one forward transport cycle, during which frame F$_2$ has been stored in the frame storage device. The selected speed reduction (as supplied to the servo control unit 60 by the SPD RED signal) controls the time interval before the CONTROL signal again causes the velocity rate signal to ramp between $-v$ and v, thereby causing the tape 16 to be transported in accordance with another forward transport cycle and the next frame (F$_3$) to be stored in the frame storage device.

The time interval between points d and e equals the time required for playback of a frame of scene information (as does the time interval between corresponding points D and E of the forward transport cycle shown in FIG. 2). It will be seen from inspection of FIG. 5b, however, that while the tape is transported a distance corresponding to three and one-half frames between points a and b, the time interval between points a and b as shown in FIG. 5b is less than the time interval between points d and e. This is because all tape transportations during periods of tape acceleration and deceleration have been speeded up to minimize the time required to complete a forward transport cycle. This is advantageous because the time required to complete the forward (or reverse) transport cycle sets a lower limit on the speed reduction. For example, a speed reduction of two is not possible if it takes longer to complete a transport cycle than it does to twice display a frame of scene information.

In the above description, it was assumed that at the beginning of a transport cycle the transducer gap of the head was in the center of a frame of scepe information (see FIGS. 2 and 3). Because the final tape position (point F or point F') is referenced to the beginning of a frame (point D or point D') by use of the frame marking signal, however, such an initial position is not a necessary condition. If the transducer gap of the head 12 is shifted from the center of a frame at the beginning of a transport cycle, the only effect on the transport cycle is a corresponding change in the distance between points C and D (in the forward transport cycle) or points C' and D' (in the reverse transport cycle). This change will cause the distance $D_T$ to change, although the nominal distance $D_T$ over several transport cycles will remain equal to the distance the magnetic tape must be transported for playback of a frame of scene information.

The invention has been described in detail with particular reference to certain preferred embodiments thereof, but it will be understood that variations and modifications can be effected within the spirit and scope of the invention.

What is claimed is:

1. Apparatus for use in providing a slow motion display of scene information recorded on a magnetic recording medium in the form of a plurality of frames of time sequential scene information, the magnetic recording medium being transportable in a reverse direction and in a forward direction, said apparatus comprising:
   (a) means for playing back information from said magnetic recording medium upon the transportation of said magnetic recording medium in the forward direction;
   (b) means for repeatedly transporting said magnetic recording medium in accordance with a transport cycle wherein said magnetic recording medium is transported in the reverse direction and then in the forward direction to effect playback of a frame of scene information during each transport cycle;
   (c) a frame storage device cooperative with said means for playing back information for storing a frame of scene information as it is played back from said magnetic recording medium by said playback means; and
   (d) means cooperative with said frame storage device for continuously reading out information stored by said frame storage device,
said transport means including means for selectively transporting said magnetic recording medium during each transport cycle a distance $D_F$ in the reverse direction and a distance $D_F+D_T$ in the forward direction, where $D_T$ is nominally equal to the distance said magnetic recording medium must be transported in the forward direction to effect playback of a single frame of scene information, thereby resulting in playback of frames of scene information in slowed chronological order that depends on the repetition rate of said means for repeatedly transporting said magnetic recording medium.

2. Apparatus as claimed in claim 1 wherein said transport means further includes means for selectively transporting said magnetic recording medium during each transport cycle a distance $D_R$ in the reverse direction and a distance $D_R - D_T$ in the forward direction, thereby resulting in slow motion playback of frames of scene information in reverse chronological order.

3. Apparatus as claimed in claim 2 further comprising means for adjusting the time interval between said transport cycles, thereby providing an information signal suitable for effecting slow motion display at a variable speed reduction that is proportional to the duration of said time interval.

4. Magnetic recorder apparatus for use in producing a slow motion display of scene information on a video monitor, said apparatus being adapted for use with a magnetic tape having frames of time sequential scene information recorded thereon, and said magnetic tape being longitudinally transportable by said apparatus in either a forward direction or in a reverse direction, said apparatus comprising:

(a) transport means for controllably transporting said magnetic tape longitudinally in a forward or in a reverse direction;

(b) means adapted for playing back information recorded on said magnetic tape upon the transportation of said magnetic tape in the forward direction;

(c) control means for controlling the operation of said transport means so that said magnetic tape is periodically transported in the reverse direction and then in the forward direction, each such transportation in the forward direction causing a frame of scene information to be played back by said playback means;

(d) means for storing of scene information upon playback by said playback means; and (e) means for repeatedly reading out information stored in said frame storage means for display by said video monitor;

said transport means including means for selectively periodically transporting said magnetic recording medium in accordance with a forward transport cycle wherein said magnetic recording medium is transported a distance $D_F$ in the reverse direction and then a distance $D_F + D_T$ in the forward direction, where $D_T$ is nominally equal to the distance said magnetic recording medium must be tranported in the forward direction to effect playback of a single frame of scene information, thereby resulting in slow motion playback of frames of scene information in chronological order.

5. Apparatus as claimed in claim 4 wherein said transport means also includes means for selectively periodically transporting said magnetic recording medium in accordance with a reverse transport cycle wherein said magnetic recording medium is transported a distance $D_R$ in the reverse direction and then a distance $D_R - D_T$ in the forward direction, thereby resulting in slow motion playback of frames of scene information in reverse chronological order.

6. Apparatus as claimed in claim 5 further comprising means for adjusting the time period between playback of successive frames of scene information to produce a slow motion display at an adjustable speed reduction that is proportional to said time period.

7. A method for producing a signal suitable for effecting a slow motion display of frames of time sequential scene information recorded on a magnetic tape, said magnetic tape being longitudinally transportable in a forward direction and in a reverse direction, said method comprising the steps of:

(a) periodically transporting said magnetic tape longitudinally in the reverse direction and then in the forward direction;

(b) playing back a frame of scene information from said magnetic tape during forward transportation of said tape;

(c) successively storing played back frames of scene information and (d) repeatedly reading each stored frame of scene information to produce a signal suitable for effecting a slow motion display wherein each frame of scene information is repeated a plurality of times, said magnetic tape being selectively periodically transported in accordance with either (1) a forward transport cycle wherein said magnetic tape is transported a distance $D_F$ in the reverse direction and a distance $D_F + D_T$ in the forward direction, $D_T$ being nominally equal to the distance said magnetic tape must be transported in the forward direction to effect playback of a single frame of scene information, thereby resulting in playback of frames of scene information in chronological order, or (2) a reverse transport cycle wherein said magnetic tape is transported a distance $D_R$ in the reverse direction and a distance $D_R - D_T$ in the forward direction, thereby resulting in playback of frames of scene information in chronological order.

* * * * *